Aug. 27, 1946.                J. JANDASEK                2,406,499
                           FLUID TRANSMISSION
                          Filed Aug. 23, 1943

INVENTOR.
Joseph Jandasek.
BY
A. E. Wilson
ATTORNEYS.

Patented Aug. 27, 1946

2,406,499

UNITED STATES PATENT OFFICE 2,406,499

FLUID TRANSMISSION

Joseph Jandasek, Highland Park, Mich., assignor to Bendix Aviation Corporation, South Bend, Ind., a corporation of Delaware Application August 23, 1943, Serial No. 499,614

10 Claims. (Cl. 103—115)

This invention relates to transmissions and more particularly to fluid transmissions having fluid deflecting vanes.

Heretofore in the fluid transmission art considerable difficulty has been encountered because the fluid entering a fluid energizing or energy absorbing blade wheel or a guide wheel does not approach the fluid deflecting vanes at a constant angle under conditions of varying speed and load operations. This variation in the entrance angle of the power transmitting fluid causes the fluid to impact against the entrance portions of the vanes at an undesirable angle under certain conditions of operation whereupon eddy currents and fluid turbulence are introduced resulting in inefficiency of operation of such transmissions.

An object of this invention is therefore to provide a blade wheel having fluid deflecting vanes so proportioned as to rectify fluid flow and induce smooth orderly flow of fluid between the fluid deflecting vanes whereupon turbulence is avoided, and the transmission of power is maintained at high efficiency under varying conditions of speed and load operations.

Another object of the invention is to provide an energy absorbing turbine or guide wheel having spaced main and auxiliary rectifying vanes to direct the lines of fluid flow to prevent fluid turbulence under varying conditions of speed and load.

Yet another object resides in the provision of a fluid deflecting channel formed by contoured main vanes and spaced rectifying vanes interposed between the main vanes serving to reduce the number of main vanes and rendering it possible to use vanes of thinner contour to attain increased efficiency of the transmission of power.

Still a further object is to provide fluid deflecting vanes having apertures extending through the vanes to substantially equalizing fluid pressures on opposite sides of the vanes.

A further object of the invention is to provide an impeller for a fluid transmission having flexible blades operative to automatically vary the fluid energizing characteristics of the impeller in proportion to variations of speed and load.

Another object resides in the provision of an improved impeller blade of resilient material bonded to flexible material adapted to change its contour in response to variations of speed and load and to present a streamlined contour whereby fluid turbulence is minimized.

A further object of the invention resides in the provision of an improved impeller blade having angularly movable flexible entrance and exit portions, wherein the angular relation of the entrance portion may be controlled by angular movement of the exit portion.

Other objects and advantages of this invention will be apparent from the following detailed description considered in connection with the accompanying drawing, submitted for purposes of illustration only and not intended to define the scope of the invention, reference being had for that purpose to the subjoined claims.

In the drawing wherein similar reference characters refer to similar parts throughout the several views.

Before explaining in detail the present invention it is to be understood that the invention is not limited in its application to the details of construction and arrangement of parts illustrated in the accompanying drawing, since the invention is capable of other embodiments and of being practiced or carried out in various ways. Also it is to be understood that the phraseology or terminology employed herein is for the purpose of description and not of limitation.

Figure 1:
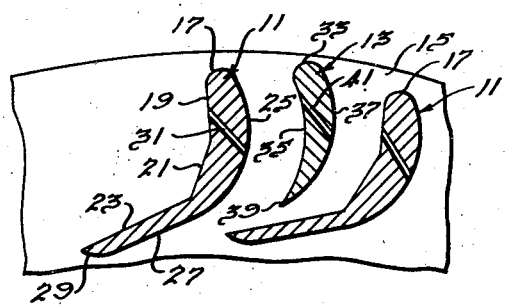
Fig. 1 is a fragmentary sectional view of a fluid deflecting blade wheel adapted for use in a fluid transmission to induce orderly flow of fluid with minimum turbulence.

Referring now to the embodiment of the invention illustrated in Fig. 1 main and rectifying fluid deflecting vanes 11 and 13 respectively are carried by the web or shroud 15 of a blade wheel such as an energy absorbing turbine or a guide wheel for operation in a power transmitting fluid circuit.

Each main vane 11 has a rounded entrance edge 17 terminating on the face of the vane in substantially flat fluid deflecting surfaces 19, 21, and 23, and the back of each main vane 11 has a surface 25 of rounded curvature terminating in a substantially flat surface 27 parallel to the surface 23 on the face of the vane. The trailing edge of the vane is contoured as illustrated at 29 to provide a smooth surface connecting the flat surfaces 23 and 27.

Spaced ducts 31 extend through the vane in inclined positions from the face to the back to provide for the flow of predetermined volumes of fluid through the vane to substantially equalize fluid pressures on opposite sides thereof.

The rectifying vanes 13 have rounded entrance portions 33 and curved face and back surfaces 35 and 37 respectively converging to the trailing edges of the vanes as illustrated at 39. These rectifying vanes are of airfoil shape and are so curved as to direct the fluid between the main vanes 11 and induce substantially streamlined fluid flow free from eddy currents or turbulence.

The leading edge 33 of the rectifying vanes are arranged slightly in advance of the leading edges 17 of the main vanes 11 so as to rectify the flow of the fluid and to induce the fluid to flow between the main vanes with minimum turbulence. The rectifying vanes also have ducts 41 extending in an inclined position through the vanes from the face to the back to permit predetermined quantities of fluid to flow therethrough so as to substantially equalize fluid pressures on opposite sides of the vanes.

The operation of this embodiment of the invention is as follows: Power transmitting fluid entering the turbine or guide wheel channel initially contacts the leading edge 33 of the rectifying vanes 13 whereupon the direction of the flow of the fluid is rectified to a considerable extent and the fluid is induced by the curved portions 35 and 37 of the rectifying vanes to flow between the main vanes 11 with minimum turbulence.

The faces of the main vanes 11 have flat surfaces 19, 21 and 23 causing the fluid to successively flow substantial distances along the face of the main vanes with relatively small stepped changes in the direction of flow hence maximum energy may be abstracted from the fluid with minimum frictional losses. The angular relation of the successive surfaces 19, 21 and 23 being quite small does not subject the fluid to sufficiently rapid deviation in its flow to introduce high turbulence or cause eddy currents of a pronounced nature. It will be understood that if desired generous fillets may be provided at the junctures of the flat surfaces 19, 21 and 23 to further minimize turbulence.

It has been found that flat surfaces on the face of the blades is desirable because such surfaces cause the fluid to flow over the face of the blade predetermined distances without rapid changes in its direction of flow so that maximum energy may be absorbed from the fluid. The fluid flowing over the curved back surface 25 of the main blades 11 is induced to follow the curvature of the blades because of known principles whereupon cavitation and eddy losses are substantially prevented. The substantially parallel surfaces 23 and 27 adjacent the outlet of the main vanes 11 guides the fluid in a desirable manner without causing any material change in the direction of the fluid flow whereupon the fluid issues from the turbine or guide wheel channel with minimum turbulence.

It will be noted that the centrally disposed flat surface 21 materially increases the thickness of the central portion of the main blades hence the channel is narrowed intermediate its length to provide a desired Venturi action which still further minimizes fluid turbulence and eddy currents.

As the fluid flows over the main and rectifying vanes 11 and 13 respectively there is a tendency for fluid pressure on the face of the vanes to increase above the fluid pressure on the back of the vanes. This variation of fluid pressures tends to induce eddy currents and cause fluid turbulence. This condition is materially overcome by the use of the ducts 31 and 41 extending through the main and rectifying vanes respectively to provide for predetermined quantities of fluid to flow through the vanes to substantially equalize fluid pressures on opposite sides thereof. It will be noted that the ducts 31 and 41 are inclined in the direction of the fluid flow whereupon flow of fluid therethrough is induced.

Figure 2:
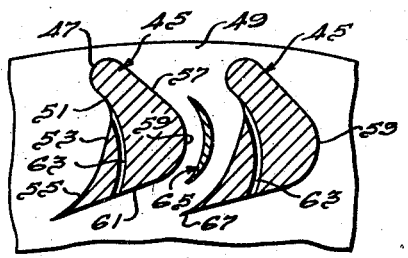
Fig. 2 is a sectional view illustrating a modified form of the invention.

The embodiment of the invention illustrated in Fig. 2 is similar in many respects to that illustrated in Fig. 1. It will be noted that main vanes 45 have rounded entrance portions 47 disposed at a smaller angle to a line tangential to the web or shroud member 49 to which the vanes are secured than do the entrance edges of the vanes 11 illustrated in Fig. 1.

The faces of the vanes 45 are formed with curved surfaces 51 extended from the entrance edge in an arc terminating in a substantially flat surface 53. The substantially flat surface 53 terminates in an arc 55 to deviate the flow of fluid and direct it to issue from the turbine or guide wheel fluid channel at a desired angle. The backs of the vanes have a substantially flat surface 57 extended from the entrance edge and terminating in an arc 59 providing substantial thickness of width to the main vane. The back surface 59 terminates in a substantially flat surface 61 converging with the arcuate shaped portion 55 of the face of the blade.

Suitable ducts 63 extend through the vanes from the face to the back of the vane, preferably from the curved surface 51 to the substantially flat surface 61 on the back of the blade to permit the flow of predetermined quantities of fluid therethrough to substantially equalize fluid pressure on opposite sides of the blade.

Rectifying vanes 65 are interposed between the main vanes 45 and are of small relatively thin cross section embodying considerable curvature.

It will be noted that the rectifying vanes are positioned deep in the fluid circuit, being spaced considerably below the entrance edges 47 of the main vanes 45, and terminating preferably above the discharge ends 67 of the main vanes. The rectifying vanes are preferably disposed opposite the curved back surface 59 of the main vanes to provide considerable guidance for the fluid and prevent the introduction of eddy current and turbulence frequently caused by the curvature of the fluid channel.

The operation of this embodiment of the invention is as follows: The entrance edges 47 of the main vanes 45 being at a less angle to a line tangential to the web or shroud member 49 permits higher speed fluid to be guided into the fluid channel with minimum turbulence, and the arcuate curved surface 51 on the face of the vane 45 guides the fluid with minimum change of direction to the substantially flat surface 53 disposed at such an angle that maximum energy may be abstracted from the fluid.

The back of the vane is contoured in such a manner as to guide the fluid through the channel with minimum turbulence whereupon a portion of the power may be absorbed by the rectifying vanes 65, however the rectifying vanes primarily function to prevent the introduction of eddy currents or turbulence between the back of one of the main vanes and the face of the next main vane. The ducts 63 projecting through the main vanes permit predetermined quantities of fluid to flow through the vanes whereupon localized higher pressure areas are substantially avoided, and turbulence and eddy currents are prevented.

While the vanes illustrated in Figs. 1 and 2 are primarily intended for use as energy absorbing turbine vanes it would be apparent that they may also function advantageously in guide wheel members to rectify the fluid flow and provide for the transmission of power from a driving member to a driven member with torque multiplication.

Figs. 3 to 6 inclusive illustrate vanes particularly adapted for use on fluid energizing impellers. Referring to the embodiment of Fig. 3 it would be noted that the impeller vane includes a substantially fixed body portion 65 having a contoured nose portion 67 to receive power transmitting fluid from a turbine or a guide wheel member, and direct it over the contoured surface 69 of the vane. The body portion 65 may be interposed between spaced web and shroud members, one of which is illustrated at 71 to form an impeller channel 73 wherein fluid may be energized as the impeller member rotates in the direction of the arrow 75.

The body portion 65 is provided with a pin 77 adapted to receive a flexible tail portion 79 formed for example of a piece of metal bent upon itself to surround the pin 77 and project beyond the trailing edge 81 of the body portion 65. The thickened section of metal or other substance may be interrupted at or near the trailing edge 81 of the body section 65 as illustrated at 83 to provide a rearwardly extending portion 85 of relatively flexible contour.

The operation of this embodiment of the invention is as follows: The leading portion 67 of the impeller vane receives the power transmitting fluid with minimum turbulence and directs it over the contoured surface 69 to energize it.

At slow speeds and heavy loads, the flexible trailing portion is deflected in the direction of the dot-dash position 87 thereby decreasing the discharge angle from the impeller and effecting a reduction in the diameter of the impeller. The amount of flexing of the flexible trailing portion 85 is of course dependent on the loads to which the device is subjected. Automatic variation of the impeller diameter in accordance with variations of speed and load is thus achieved.

At high speed and light load conditions of operation as when the transmission is operating as a fluid clutch, the loads to which the vanes are subjected are smaller than the loads to which they are subjected when high torque is being transmitted at slower speeds when the device is functioning as a torque converter. At the higher speeds where lighter loads are transmitted, the flexing of the trailing portion 85 is therefore less than when heavy loads are being transmitted and the effective diameter of the impeller is maintained large whereupon efficient transmission of power results.

Figure 3:
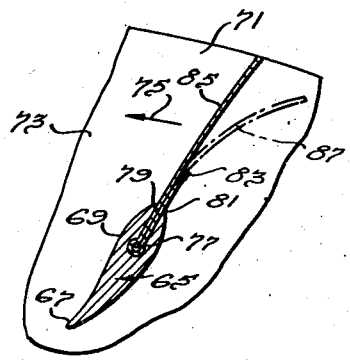
Fig. 3 is a fragmentary sectional view of a fluid energizing impeller member having fluid deflecting vanes provided with flexible exit portions.
Figure 4:
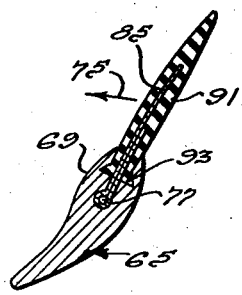
Figs. 4 and 5 are views similar to Fig. 3 illustrating a further modified form of the invention.

The embodiment illustrated in Fig. 4 is generally similar to that illustrated in Fig. 3. It will be noted that a resilient casing 91 is positioned to overlie the flexible trailing portion 85 to streamline the path of fluid flow from the contoured portion 69 of the body portion 65 and reduce fluid turbulence. The resilient casing 91 is free to flex with the flexible trailing portion 85 whereupon the desired automatic compensation of the diameter of the impeller is provided for variations of load. It will be noted that the casing 91 may be dovetailed into the body portion 65 as illustrated at 93 by a molding or other suitable bonding operation to secure the elements together.

Figure 5:
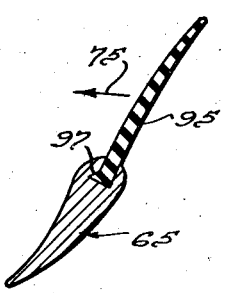

In the embodiment illustrated in Fig. 5 the flexible strip forming the trailing end of the blade is eliminated, and a flexible trailing portion 95 formed of rubber or any other suitable substances is attached to the body portion 65 as illustrated at 97. The flexible trailing portion 95 may deflect under the influence of the load to which it is subjected to compensate for variations of load in the same manner as the embodiments illustrated in Figs. 3 and 4.

Figure 6:
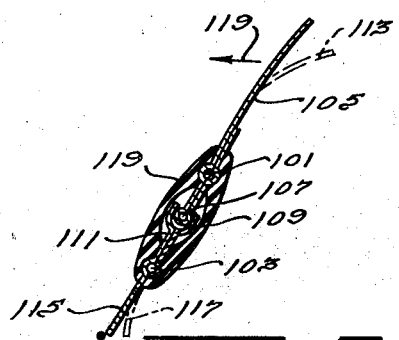
Fig. 6 is a fragmentary sectional view of an impeller vane having pivoted flexible entrance and discharge portions.

The impeller blade illustrated in Fig. 6 embodies a pair of spaced stationary pins 101 and 103, which if desired may be secured in spaced impeller and shroud members. A flexible tail portion 105 is pivotally mounted on the stationary pin 101 and is provided with a crown portion 107 adapted to fit within a forked portion 109 of a member 111 mounted on the stationary pin 103. The tail portion 105 is free to flex angularly toward the dotted line position 113 under the influence of variations of load to which it is subjected.

As the flexible tail portion 105 is subjected to a force to move it angularly in either direction it pivots about the stationary pin 101 whereupon the crown portion 107 moves the fork member 109 of the member 111 to pivot the nose portion 115 of the member 111 about the pin 103 to vary the angular relation of the nose portion 115. The flexible nose portion 115 is also free to flex under the influence of the load to which it is subjected to move toward the dotted line position 117 under the influence of forces to which it is subjected during rotation of the impeller member in the direction of the arrow 119.

The pins 101 and 103 together with the actuating crown and fork members 107 and 109 may be covered by means of a shell 119 molded or otherwise suitably attached thereto.

This is a continuation in part of my co-pending applications Serial No. 337,037, filed May 24, 1940, now Patent No. 2,351,516, dated June 13, 1944, and Serial No. 307,285, filed December 2, 1939, now Patent No. 2,327,647, dated August 24, 1943.

I claim:

1. A rotatable wheel, spaced streamline main vanes on the wheel having rounded entrance edges and passages through the bodies thereof, and rectifying vanes on the wheel intermediate the main vanes.

2. An impeller blade for a fluid transmission comprising a shaft adapted to be pivotally mounted in impeller shroud and web members, a tail portion formed of a strip of flexible material bent around said shaft and projecting rearwardly therefrom, a portion of the length of the tail portion being formed of double thickness of material, and a substantially rigid nose portion pivotally mounted on said shaft and extending beyond the shaft to engage a portion of flexible material of double thickness.

3. An impeller blade for a fluid transmission comprising a shaft adapted to be pivotally mounted in impeller shroud and web members, a tail portion formed of a strip of flexible material bent around said shaft and projecting rearwardly therefrom, a portion of the length of the tail portion being formed of double thickness of material, a substantially rigid nose portion pivotally mounted on said shaft and extending beyond the shaft to engage a portion of flexible material of double thickness, and a thin layer of resilient non-magnetic material molded on the tail portion.

4. An impeller blade for a fluid transmission having impeller shroud and web members comprising a pair of spaced shafts pivotally mounted in the shroud and web members, a flexible tail portion pivotally mounted intermediate its length on one of the shafts and having a forwardly extending actuating member and a rearwardly extending flexible fluid deflecting member of variable flexibility, a bifurcated member receiving said actuating member pivotally mounted on the other of said spaced shafts, and a forwardly extending deflecting member carried by the bifurcated member to deflect fluid.

5. In a fluid transmission a blade wheel having spaced fluid deflecting vanes forming a power transmitting fluid channel, each of the vanes having a rounded entrance portion to receive power transmitting fluid with minimum turbulence, an enlarged body portion having a plurality of flat surfaces on its face and an extended trailing portion having substantially flat parallel surfaces to guide the fluid as it leaves the fluid channel thereby minimizing fluid turbulence.

6. In a fluid transmission a blade wheel having spaced fluid deflecting vanes forming a power transmitting fluid channel, each of the vanes having a rounded entrance portion to receive power transmitting fluid with minimum turbulence, a body portion having flat surfaces on its face, and a trailing portion having substantially flat parallel surfaces extending over more than one-third of the length of the vane to guide the fluid as it leaves the fluid channel to substantially prevent eddy currents and fluid cavitation.

7. A turbine vane for a fluid transmission comprising a body portion having a curved back, and a face formed of a plurality of substantially flat angularly related surfaces, the included angle between each surface and its succeeding surface being lesser progressively and in the same direction from the leading edge to the trailing edge of the vane.

8. In a fluid transmission, a turbine having a plurality of spaced fluid deflecting energy absorbing vanes, each vane having a rounded entrance portion, a body portion having a plurality of substantially flat angularly related surfaces on the face thereof and a curved back portion terminating in a substantially flat surface extending parallel with one of the flat surfaces of the face of the vane.

9. In a fluid energizing impeller, a vane comprising spaced pins on the vane, a flexible tail portion pivotally mounted on one of the pins, a flexible entrance portion pivotally mounted on the other pin, and motion transmitting means carried by the tail and entrance portions whereby the position of one of said portions is influenced by the position of the other portion.

10. In an impeller, a vane, spaced stationary members on the vane, a tail portion pivotally mounted on one of the members, an entrance portion pivotally mounted on the other member, motion transmitting means between the tail and entrance portions whereby the angular position of one portion is influenced by the angular position of the other portion.

JOSEPH JANDASEK.